United States Patent Office 3,689,296
Patented Sept. 5, 1972

3,689,296
CEMENT COMPOSITION CONTAINING ALKANOL-AMINOLIGNOSULFONATE - FORMALDEHYDE SETTING RETARDER
Jean-Guy Landry, 1490 de la Verendrye, Quebec City 3, Quebec, Canada
No Drawing. Continuation-in-part of application Ser. No. 874,679, Nov. 6, 1969. This application Nov. 29, 1971, Ser. No. 203,004
Int. Cl. C04b 7/52, 13/28
U.S. Cl. 106—90   6 Claims

ABSTRACT OF THE DISCLOSURE

A setting retarder for concrete comprises the reaction product of formaldehyde and an aminolignosulfonate prepared by adding an amine to spent sulfite liquor. The retarder is added to the portland cement clinker which is then ground.

---

This application is a continuation-in-part of application Ser. No. 874,679, filed Nov. 6, 1969, now abandoned.

This invention relates to portland cement and more particularly to the provision therein of a setting retarder other than the usual gypsum whereby problems arising from the use of gypsum are avoided and the amount of water required for a mix of a given degree of fluidity will be substantially reduced.

Portland cement has, of course, become one of the most important building materials. The considerable amount of research already carried out has resulted in the present day high quality of concrete. The cement manufacturing process is almost complete when the clinker has been produced. There remains only grinding, with the addition of relatively small quantities of one or more materials.

It was only when the appreciable effect of cement fineness on the rate of its strength development was discovered, and when the fineness was increased that cases of flash setting became more frequent. The discovery that a small addition of gypsum can overcome this trouble was a considerable step forward in cement technology.

Even today, it is not quite clear why a small addition of gypsum is capable of preventing flash setting of cement. There is no doubt, however, that gypsum quickly reacts with tricalcium aluminate ($C_3A$) to form a compound practically insoluble in water: this compound is called calcium sulpho-aluminate.

The calcium sulphate acts as a setting retarder and the amount added to the clinker is usually 2 to 5% of the weight of the cement. Without this, the cement would set rapidly. Pastes of many powdered cements will heat up and stiffen almost immediately upon mixing of the powder and water and this is generally referred to as flash set. However, even with the inclusion of gypsum, an early or premature stiffening (false set) sometimes occurs, which can be troublesome if it occurs before the concrete is placed. False set in cement is evidenced in concrete by a significant loss of consistency shortly after mixing. After additional remixing, however, this concrete regains its original consistency.

There are many problems arising from the use of gypsum. First, it is difficult to feed accurately, as large lumps are difficult to handle and as fine materials favour segregation of the clinker-gypsum mixture. Second, gypsum has to be free from surface moisture and it has to be stored under shelter otherwise it tends to cake and bridge in the feed bins. Third, the quality of gypsum is not too consistent, since it contains such impurities as clay, silica and calcium carbonate. Fourth, gypsum ($CaSO_4 \cdot 2H_2O$) often contains anhydrite ($CaSO_4$) which has an unsatisfactory effect on the setting time of cement. Fifth, gypsum has no structural strength and weakens the strength of the portland cement since as much as 5% gypsum is sometimes added to the clinker. Sixth, the temperature in the grinding mills has to be kept at less than 250° F. to prevent partial dehydration of gypsum to anhydrite.

Cement manufacturers generally consider the results obtained with gypsum as satisfactory. The present invention seeks to open a new road in the technology of portland cement by eliminating the use of gypsum while improving the present performance of cement.

The product of the present invention is adapted to be easily and accurately fed and without segregation from the clinker; a liquid or a solid in solution could be used to provide these effects. The weakening effect of gypsum at rates of up to 5% could be counterbalanced if the solids added to the clinker were used in a much smaller amount at, say, less than 1%.

The set retarder of the invention is produced from spent sulphite liquor such as is obtained from the pulping of wood and other lignocellulosic materials. For instance, the spent sulfite liquor obtained from the pulping of wood by the neutral and acid bisulfite processes or the sulfonated kraft process may be employed.

The use of lignosulfonates in concrete manufacture is well known since it lowers the water requirements and retards the setting of a concrete mix.

The mechanism involved in the reaction is still a matter of doubt. Some researchers suggest that the mechanism is simply an adsorption effect on $C_3A$; some others that chemisorption is also involved. However, it is generally accepted that lignosulfonates modify the hydration of $C_3A$ with the formation of different crystals rather than the formation of a new hydrate.

In experimental tests, it has been found that all lignosulfonates used as a replacement for gypsum in cement had one shortcoming in common; because of the high heat liberation, which brought the temperature of the cement paste from 70° to 94° F., there was always a false set of the cement paste.

Addition of formaldehyde in amounts of 5 to 20% by weight of the lignosulfonates also resulted in a product which was not entirely satisfactory.

In accordance with the invention, the original calcium base of the lignosulfonates in the spent liquor is changed to an amine base. This is accomplished by saturating the spent sulfite liquor with $SO_2$ and then adding a stoichiometric amount of an alkanolamine, such as monoethanolamine, diethanolamine and triethanolamine. The calcium sulfite precipitates upon the addition of the amine and is readily filtered away.

The remaining solution containing the alkanolaminolignosulfonate is preferably concentrated to about 40–50% solids and then formaldehyde is mixed therewith.

The precise role of the formaldehyde is to tie the alkanolamine to the lignosulfonic acid moiety, so that there is no splitting of the amine when the alkanolaminolignosulfonate is used in the alkaline medium. This may be illustrated in the case of the monoalkanolamine, by the following reaction:

$$LSH + CH_2O + RNH_2 \rightarrow LSCH_2NHR + H_2O$$

where LS is the lignosulfonic acid radical and R is the alkylol radical. Similar equations can be written for the reactions taking place when di- and trialkanolamines are used.

The mixture of alkanolaminolignosulfonate and formaldehyde is stirred for a sufficient period of time to permit a complete and uniform reaction (say 15–30 minutes). Preferably, the lignosulfonate solution is maintained at a temperature of about 30 to 60° C. during the mixing step. The formaldehyde is added at an approximate ratio of 1.0 to 1.5 mol per mol of alkanolamine present in the alkanolaminolignosulfonate. Thus, the formaldehyde may be added in the amount of about 300 to 500 pounds per ton of solids in the solution.

The resulting mixture is then dried, as by spray drying.

The following examples are illustrative of the manner of preparation of the alkanolaminolignosulfonate and the reaction product of formaldehyde therewith.

EXAMPLE I

Three litres of spent sulphite liquor (10% solids) were brought to 70° C. and a current of $SO_2$ was bubbled through the solution until a constant pH was reached (pH 2.1). 7570 g. of the acidified spent sulfite liquor, thus obtained, was neutralized to a pH of about 9.0 with 470 ml. monoethanolamine.

EXAMPLE II

The end product was similar to the one obtained in Example I except that the lignosulfonic acid, before neutralization with diethanolamine, was treated by passing it through a cation exchange column.

400 g. lignosulfonic acid (50% solids) of pH 1.2 were brought to pH 9.0 with 70 ml. diethanolamine to yield the corresponding diethanolaminolignosulfonic.

EXAMPLE III 922 g. (40% solids) monoethanolaminolignosulfonate of pH 7.3 was treated with 62.4 g. formaldehyde (37% solution). The mixture was stirred for about 15 minutes, then spray dried.

EXAMPLE IV 7570 g. spent sulfite liquor at 11.8% solids was treated with sulphur dioxide gas until pH 1.9 was reached. Then 470 ml. monoethanolamine was added to bring the pH to 9.0. After a while, the mixture was filtered and evaporated. A stoichiometric amount of formaldehyde (970 g. as 37% solution) based on the amine present was then added.

The mixture, approximately three litres, was divided in three portions of 1 litre each, which were refluxed for 1, 2, 3 hours, respectively.

The following examples are illustrative of the results obtained in the producrtion of concrete using portland cement in accordance with the invention.

EXAMPLE V

Concrete cubes were prepared according to ASTM designation C 109–54T method, with a clinker containing 0.5% of the monoethanolaminolignosulfonate-formaldehyde product, prepared as set out above, as a replacement for 5% gypsum. These cubes were compared with cubes made from the same clinker containing the normal 5% gypsum used in that clinker with the following results:

|  | Clinker 99.5%, composition of invention 0.5% | Clinker 95%, gypsum 5% |
| --- | --- | --- |
| Normal consistency | 22.4% (112 ml.) | 25.0% (125 ml.). |
| Initial set | 120 minutes | 90 minutes. |
| Final set | 9.0 hours | 7.5 hours. |
| Compressive strength of concrete cubes: |  |  |
| Days: |  |  |
| 1, p.s.i | 1,050 | 1,300. |
| 3, p.s.i | 2,800 | 2,800. |
| 7, p.s.i | 4,260 | 3,700. |
| 14, p.s.i | 4,437 |  |
| 21, p.s.i | 5,400 |  |
| 28, p.s.i | 5,700 | 4,500. |

EXAMPLE VI

When using a composition containing the diethanolaminolignosulfonate-formaldehyde setting retarder of the invention at the rate of 0.5% and 99.5%, clinker, the following results were obtained.

|  | Clinker 99.5%, composition of invention 0.5% | Clinker 95%, gypsum 5% |
| --- | --- | --- |
| Normal consistency | 23.2% (116 ml.) | 25.0% (125 ml.). |
| Initial set | 150 minutes | 90 minutes. |
| Final set | 7½ hours | 7½ hours. |
| Compressive strength: |  |  |
| Days: |  |  |
| 1, p.s.i | 1,020 | 1,300. |
| 3, p.s.i | 3,000 | 2,800. |
| 7, p.s.i | 4,440 | 3,700. |
| 28, p.s.i | 5,225 | 4,500. |

Essentially the same results were obtained using a triethanolaminolignosulfonate-formaldehyde setting retarder composition of the invention.

It can be seen that, when the composition of the invention is used to replace gypsum to control the setting time of cement, the one day strength is slightly lower (lignosulfonates retard the hardening of concrete for a few hours), but by the third day the compressive strength is the same and it becomes larger by more than 20% at 28 days.

Because of the better mix consistency, produced by using the composition of this invention, it is possible to reduce the amount of water employed in a mix and still produce one that has a satisfactory degree of fluidity so as to be workable. This reduction in the amount of water produces a concrete of increased strength. It also makes possible the use of leaner mixtures, that is, mixtures having relatively smaller amounts of cement than usually employed with the same final strength.

From the above it will be seen that there is provided by the present invention a set controlling agent which can readily be added to clinker before grinding and that can easily and accurately be fed in solution, so avoiding troubles encountered with gypsum as a powder. It will also be seen that because of the increased flowability, produced by the dispersing effect of this composition, the quantity of water employed in the mix can be substantially reduced thereby providing a better concrete.

I claim:

1. Portland cement consisting of about 95–99.5% by weight ground portland cement clinker and the remainder as a setting retarder a composition consisting of the reaction product of stoichiometric amounts of formaldehyde and an alkanolaminolignosulfonate prepared by acidifying a spent sulfite liquor solution, neutralizing said solution with an alkanolamine to form an alkanolaminolignosulfonate solution, concentrating said solution and then mixing formaldehyde therewith at a ratio or about 1 to 1.5 mol per mol of alkanolamine present in said alkanolaminolignosulfonate, said alkanolamine being selected from the group consisting of monoethanolamine, diethanolamine, and triethanolamine.

2. Portland cement as defined in claim 1, wherein said alkanolamine is monoethanolamine.

3. Portland cement as defined in claim 1, wherein said ground clinker comprises about 99.5% and said retarder about 0.5% by weight of said cement.

4. A method of making portland cement which comprises adding from about 0.5% to 5.0% by weight of the reaction product of stoichiometric amounts of formaldehyde and an alkanolaminolignosulfonate, prepared by acidifying a spent sulfite liquor solution, neutralizing said solution with an alkanolamine to form an alkanolaminolignosulfonate solution, concentrating said solution and then mixing formaldehyde therewith at a ratio or about 1 to 1.5 mol per mol of alkanolamine present in said alkanolaminolignosulfonate, said alkanolamine being selected from the group consisting of monoethanolamine, diethanolamine, and triethanolamine to a portland cement clinker, and then grinding said clinker with said added product.

5. A method of making portland cement which comprises adding about 0.5% by weight of the reaction product of stoichiometric amounts of formaldehyde and a monoethanolaminolignosulfonate, prepared by acidifying a spent sulfite liquor solution, neutralizing said solution with monoethanolamine to form a monoethanolaminolignosulfonate solution, concentrating said solution and then mixing formaldehyde therewith at a ratio of about 1 to 1.5 mol per mol of monoethanolamine present in said monoethanolaminolignosulfonate, to a portland cement clinker, and then grinding said clinker with said added product.

6. A method of making portland cement as defined in claim 5, wherein said reaction product is added by spraying a solution thereof onto said clinker.

References Cited

UNITED STATES PATENTS

| | | | |
|---|---|---|---|
| 3,398,005 | 8/1968 | Felicetta et al. | 106—90 |
| 3,351,478 | 11/1967 | Dodson et al. | 106—90 |
| 3,317,327 | 5/1967 | Matsuda et al. | 106—90 |
| 3,277,162 | 10/1966 | Johnson | 106—90 |
| 3,234,154 | 2/1966 | Martin | 106—90 |
| 2,690,975 | 10/1954 | Scripture | 106—90 |

JAMES E. POER, Primary Examiner

W. T. SCOTT, Assistant Examiner

U.S. Cl. X.R.

106—102, 315